(12) United States Patent
Shimizu et al.

(10) Patent No.: US 8,807,260 B2
(45) Date of Patent: Aug. 19, 2014

(54) MAGNETOSTRICTIVE TORQUE SENSOR, ELECTRICALLY ASSISTED BICYCLE AND ELECTRIC POWER STEERING APPARATUS CARRYING THE SENSOR

(71) Applicant: Honda Motor Co., Ltd., Tokyo (JP)

(72) Inventors: Yasuo Shimizu, Saitama (JP); Yutaka Arimura, Saitama (JP); Masahiro Kuroki, Saitama (JP); Kentaro Ikegami, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 13/680,230

(22) Filed: Nov. 19, 2012

(65) Prior Publication Data

US 2013/0133969 A1    May 30, 2013

(30) Foreign Application Priority Data

Nov. 29, 2011   (JP) ................. 2011-260134

(51) Int. Cl.
| | |
|---|---|
| *G01L 3/10* | (2006.01) |
| *B62M 6/50* | (2010.01) |
| *B62K 11/00* | (2006.01) |
| *G01L 5/22* | (2006.01) |
| *B62M 3/00* | (2006.01) |
| *B62D 6/10* | (2006.01) |
| *B62M 6/55* | (2010.01) |

(52) U.S. Cl.
CPC .................. *G01L 3/102* (2013.01); *B62M 6/50* (2013.01); *B62K 11/00* (2013.01); *G01L 5/221* (2013.01); *B62M 3/003* (2013.01); *B62D 6/10* (2013.01); *B62M 6/55* (2013.01)
USPC ....................................................... 180/220

(58) Field of Classification Search
CPC .. B62K 2202/00; B62K 2204/00; G01L 3/10; G01L 3/102; G01L 5/221; H01L 41/221
USPC ...................................... 73/862.333; 180/220
See application file for complete search history.

(56) References Cited

U.S. PATENT DOCUMENTS

| | | | |
|---|---|---|---|
| 5,165,286 A | 11/1992 | Hamamura et al. | |
| 5,526,704 A * | 6/1996 | Hoshina et al. | .......... 73/862.335 |

(Continued)

FOREIGN PATENT DOCUMENTS

| | | |
|---|---|---|
| DE | 41 21 507 A1 | 1/1992 |
| DE | 697 01 586 T2 | 8/2000 |
| DE | 101 18 153 A1 | 10/2001 |
| DE | 102 06 702 A1 | 9/2002 |
| DE | 696 24 193 T2 | 2/2003 |

(Continued)

OTHER PUBLICATIONS

JP Office Action issued in corresponding application, mailed Nov. 5, 2013, with partial English translation thereof.

*Primary Examiner* — Joseph M Rocca
*Assistant Examiner* — Felicia L Brittman
(74) *Attorney, Agent, or Firm* — Carrier Blackman & Associates, P.C.; William D. Blackman; Jeffrey T. Gedeon

(57) ABSTRACT

A magnetostrictive torque sensor includes a magnetostrictive portion formed on a rotational shaft, a bobbin surrounding an outer circumference of the magnetostrictive portion, and a coil wound on the bobbin for detecting a change in magnetic property of the magnetostrictive portion. The bobbin fits over the magnetostrictive portion in contact with the magnetostrictive portion in such a manner as to allow rotation of the magnetostrictive portion relative to the bobbin. The magnetostrictive torque sensor is carried on an electrically assisted bicycle or an electric power steering apparatus of a vehicle.

4 Claims, 10 Drawing Sheets

(56) References Cited

U.S. PATENT DOCUMENTS

| | | | |
|---|---|---|---|
| 5,664,638 | A | 9/1997 | Padula |
| 6,237,428 | B1 | 5/2001 | Odachi et al. |
| 6,370,967 | B1 | 4/2002 | Kouketsu et al. |
| 6,484,592 | B2 | 11/2002 | Sezaki |
| 6,595,074 | B2 * | 7/2003 | Shimizu et al. .......... 73/862.333 |
| 7,013,741 | B2 | 3/2006 | Nakamura et al. |
| 7,677,115 | B2 * | 3/2010 | Fukuda et al. ........... 73/862.335 |
| 7,757,570 | B1 | 7/2010 | Marin et al. |
| 8,170,811 | B2 | 5/2012 | Grab et al. |
| 2007/0068726 | A1 | 3/2007 | Shimizu |
| 2011/0006760 | A1 | 1/2011 | Glueck et al. |

FOREIGN PATENT DOCUMENTS

| | | |
|---|---|---|
| DE | 60 2004 006 041 T2 | 9/2007 |
| DE | 10 2007 046 749 A1 | 11/2008 |
| DE | 10 2010 006 583 A1 | 10/2010 |
| JP | 64-17444 | 1/1989 |
| JP | 03-075534 A | 3/1991 |
| JP | 05-052679 A | 3/1993 |
| JP | 09-095289 A | 4/1997 |
| JP | 2000-053069 A | 2/2000 |
| JP | 2001-296191 A | 10/2001 |
| JP | 2010-249732 A | 11/2010 |
| WO | 2009/079980 A1 | 7/2009 |

* cited by examiner

MAGNETOSTRICTIVE TORQUE SENSOR, ELECTRICALLY ASSISTED BICYCLE AND ELECTRIC POWER STEERING APPARATUS CARRYING THE SENSOR

FIELD OF THE INVENTION

The present invention relates to a magnetostrictive torque sensor, an electrically assisted bicycle and an electric power steering apparatus which carry the sensor.

BACKGROUND OF THE INVENTION

A well-known electrically assisted bicycle is propelled with the help of a power generated by an electric motor in response to a pedaling force of a rider, as disclosed in JP-A-2000-53069.

An electrically assisted bicycle disclosed in JP-A-2000-53069 includes a magnetostrictive torque sensor for detecting a rider's pedaling force. The magnetostrictive torque sensor, which includes coils and magnetostrictive portions, is disposed along an outer circumference of a crankshaft.

The crankshaft is subjected to a torsional torque when the rider pedals the bicycle. The application of the torsional torque to the crankshaft causes a change in magnetic field in the magnetostrictive portions formed on an outer circumferential surface of the crankshaft. The change in magnetic field is detected by the coils, and a control unit drives an electric motor in response to the detection to produce an auxiliary torque to be transmitted via a sprocket and a chain to a rear wheel. The auxiliary torque is added to a pedaling torque exerted by the rider's feet on pedals of the bicycle, whereby the rider can propel the bicycle with a small pedaling force.

The electrically assisted bicycle may be propelled under various temperature conditions. For example, a temperature of an air may change during propulsion of the bicycle. This temperature change may affect the coils and the magnetostrictive portions in different amounts of time because the coils and the magnetostrictive portions are supported by separate members. That is, a difference in temperature may occur between the coils and the magnetostrictive portions. This difference in temperature causes an error in the pedaling torque detected by the magnetostrictive torque sensor. If a pedaling torque detected by the sensor is smaller than an actual pedaling torque exerted by the rider's feet on the pedals, an auxiliary torque produced by the electric motor is smaller than a desired auxiliary torque which should have been produced by the electric motor. When such a smaller torque is produced by the electric motor, the rider has to pedal the bicycle with a large pedaling force.

SUMMARY OF THE INVENTION

An object of the present invention is to provide a magnetostrictive torque sensor having an enhanced detection accuracy.

According to a first aspect of the present invention, there is provided a magnetostrictive torque sensor comprising: a magnetostrictive portion formed on a rotational shaft; a bobbin surrounding an outer circumference of the magnetostrictive portion; and a coil wound on the bobbin for detecting a change in magnetic property of the magnetostrictive portion, wherein the bobbin fits over the magnetostrictive portion in contact with the magnetostrictive portion in such a manner as to allow rotation of the magnetostrictive portion relative to the bobbin.

The bobbin on which the coils are wound fits over the magnetostrictive portions in contact with the magnetostrictive portions in such a manner as to allow the rotation of the magnetostrictive portions relative to the bobbin. Since the bobbin is in contact with the magnetostrictive portions, the coils are located proximate the magnetostrictive portions. Since the coils and the bobbin are located closely to the magnetostrictive portions, a temperature change occurring in the coils or the bobbin quickly affects other elements such as the magnetostrictive portions, such that a difference in temperature between the coils and the magnetostrictive portions becomes small quickly. Since the temperatures of the magnetostrictive portions quickly becomes near the temperatures of the coils, high detection accuracy is secured. Also, high detection sensitivity is secured due to a smaller distance between the coils and the magnetostrictive portions.

Preferably, the bobbin is supported by the rotational shaft.

The magnetostrictive portions are formed on the rotational shaft and the bobbin contacts the magnetostrictive portions. Thus, when a load is applied to the rotational shaft in such a direction as to twist the rotational shaft, the bobbin follows the twisted shaft. The coils, which are wound on the bobbin, also follow the twisted shaft. As a result, a distance between the magnetostrictive portions and the coils is kept constant. Because of the constant distance between the magnetostrictive portions and the coils, detection accuracy of the magnetostrictive sensor is enhanced.

In a preferred form of the present invention, the magnetostrictive torque sensor further comprises a case covering the bobbin with a clearance defined therebetween.

The clearance is outside an outer circumferential surface of the bobbin, and thus the coils wound on the bobbin are covered by the case with the clearance formed between the case and the coils. The clearance between the case and the coils provides an air layer acting as a thermal insulating layer to make it difficult for the coils to be affected by a change in temperature outside the case, and hence little difference in temperature between the coils and the magnetostrictive portions occurs. This results in an enhanced detection accuracy of the magnetostrictive torque sensor.

In a further preferred form of the present invention, the magnetostrictive portion is a single magnetostrictive film formed on an overall circumference of the rotational shaft, the magnetostrictive film having a substantially constant thickness.

Because of the constant thickness of the film, the film keeps its temperature stable entirely. Since the temperature is stable throughout the film, detection accuracy of the magnetostrictive torque sensor is enhanced.

In a still further preferred form of the present invention, the magnetostrictive torque sensor further comprises: a terminal extending from the bobbin through the case for energizing the coil; and an elastic member interposed between the terminal and the case.

The elastic member, which is interposed between the terminal and the case, absorbs vibration of the case transmitted from outside the case. This means that the elastic member prevents application of an external force from the case to the terminal, whereby the external force is not applied to the bobbin. The prevention of transmission of the external force to the bobbin makes it possible to effectively protect the bobbin and the coils wound on the bobbin. Also, the bobbin and the coils are thermally insulated from the case.

A force applied to the rotational shaft may be transmitted to the bobbin. The elastic member, which is interposed between the case and the terminal extending from the bobbin, can absorb the force between the case and the terminal so as to reduce a reaction force from the case. This results in an enhanced detection accuracy of the magnetostrictive torque sensor.

According to a second aspect of the present invention, there is provided an electrically assisted bicycle comprising: a driving wheel; a pedal crank; a magnetostrictive torque sensor for detecting a pedaling torque exerted on the pedal crank; an electric motor for producing an auxiliary torque to be applied to the drive wheel on the basis of the pedaling torque; a hollow rotational shaft; a one-way clutch; the pedal crank including a crankshaft fitting through the hollow rotational shaft in such a manner as to rotate relative to the hollow rotational shaft, the crankshaft being connected to the hollow rotational shaft via the one-way clutch; the magnetostrictive torque sensor comprising: a magnetostrictive portion formed on the hollow rotational shaft; a bobbin surrounding an outer circumference of the magnetostrictive portion; and a coil wound on the bobbin for detecting a change in magnetic property of the magnetostrictive portion, and wherein the bobbin fits over the magnetostrictive portion in contact with the magnetostrictive portion in such a manner as to allow rotation of the magnetostrictive portion relative to the bobbin.

The magnetostrictive torque sensor is carried on the electrically assisted bicycle. The magnetostrictive torque sensor has the bobbin directly supported by the rotational shaft. Because of the bobbin directly supported by the rotational shaft, the magnetostrictive sensor is smaller in size than if the bobbin and the rotational shaft were supported by separate members, respectively. The smaller size of the magnetostrictive sensor makes a vicinity of the crankshaft compact. That is, members which would otherwise hinder a rider's pedaling operation are compactly arranged away from a trajectory of the revolving pedal so as to facilitate his pedaling operation. In addition, these compactly arranged members provide pleasant visual appearance.

Preferably, the hollow rotational shaft includes one end defining a housing portion having an enlarged diameter to receive the one-way clutch, and the housing portion has an axial end surface fixing an axial position of the bobbin.

As a result, the coils are accurately positioned relative to the magnetostrictive portions. Since no additional members are required in positioning the coils relative to the magnetostrictive portions, downsizing of the magnetostrictive torque sensor can be achieved. Since the axial position of the bobbin is fixed to prevent axial movement of the bobbin, the detection performed by the coils is steady even when the bobbin undergoes impact or vibration during propulsion of the bicycle on an uneven surface of a road. This results in an enhanced detection accuracy of the magnetostrictive torque sensor.

According to a third aspect of the present invention, there is provided an electric power steering apparatus comprising: a steering system having a steering wheel, a rotational shaft and steerable vehicle wheels; a magnetostrictive torque sensor for detecting a steering torque applied to the steering wheel; an electric motor for producing an auxiliary torque to be applied to the vehicle wheels on the basis of the steering torque; the magnetostrictive torque sensor comprising: a magnetostrictive portion formed on the rotational shaft; a bobbin surrounding an outer circumference of the magnetostrictive portion; and a coil wound on the bobbin for detecting a change in magnetic property of the magnetostrictive portion, wherein the bobbin fits over the magnetostrictive portion in contact with the magnetostrictive portion in such a manner as to allow rotation of the magnetostrictive portion relative to the bobbin.

The magnetostrictive torque sensor is carried on the electric power steering apparatus. The magnetostrictive torque sensor has the bobbin directly supported by the rotational shaft. The magnetostrictive torque sensor has a smaller size than if the rotational shaft and the bobbin were supported by separate members, respectively. The magnetostrictive torque sensor exhibits its performance without depending upon the case, and thus can be carried on any electric power steering apparatus regardless of type of the electric power steering apparatus. Since the magnetostrictive torque sensor has the smaller size, the electric power steering apparatus is so compact as to be carried on a vehicle which is not suitable for carrying a hitherto known electric power steering apparatus.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

A first embodiment of the present invention is discussed hereinafter.

Figure 1:
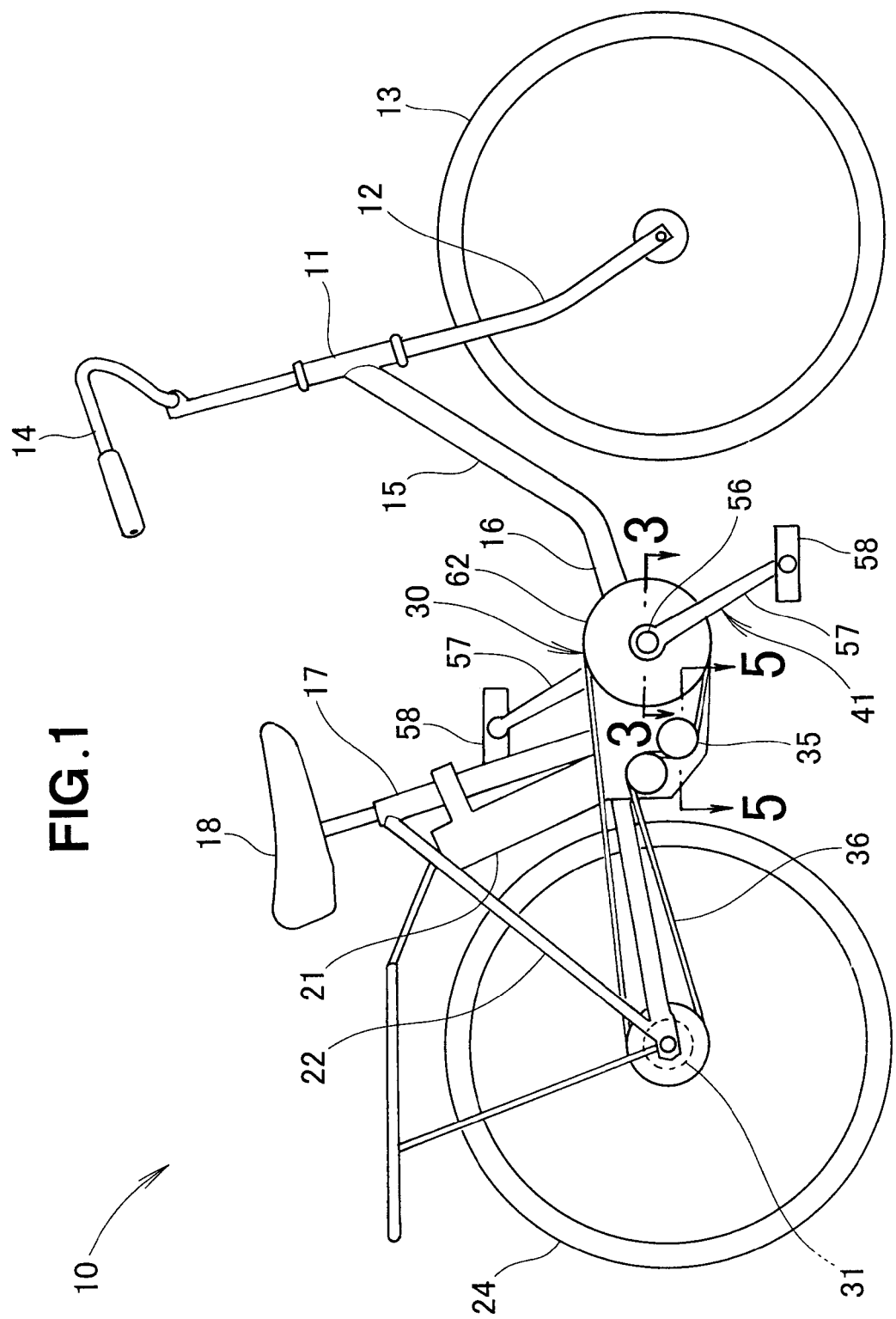
FIG. 1 is a side elevational view of an electrically assisted bicycle carrying a magnetostrictive torque sensor in a first embodiment of the present invention.

Referring to FIG. 1, an electrically assisted bicycle 10 is propelled by a pedaling torque exerted by a rider's feet on pedals 58, 58 of the bicycle 10 and an auxiliary torque produced by an electric motor on the basis of the pedaling torque.

The bicycle 10 includes a head pipe 11 and a front fork 12 steerably attached to the head pipe 11. The front fork 12 has its lower end to which a front wheel 13 is rotationally attached. The head pipe 11 has an upper portion to which is attached a handlebar 14 for steering the front fork 12. The bicycle 10 also includes a down frame 15 extending downward and rearward from the head pipe 11, a lower frame 16 extending rearward from a rear end of the down frame 15, and a saddle pipe 17 extending upward from a rear end portion of the lower frame 16. The bicycle 10 also includes a saddle 18 for a rider to sit on. The saddle 18 is provided atop the saddle pipe 17. The bicycle 10 further includes a battery 21 attached to the saddle pipe 17 and located below the saddle 18. The bicycle 10 further includes a generally V-shaped rear frame 22 extending rearward from upper and lower portions of the saddle pipe 17. The rear frame 22 has a rear end to which a rear wheel 24 is rotationally attached. The bicycle 10 further includes a power unit 30 for driving the rear wheel 24.

Figure 2:
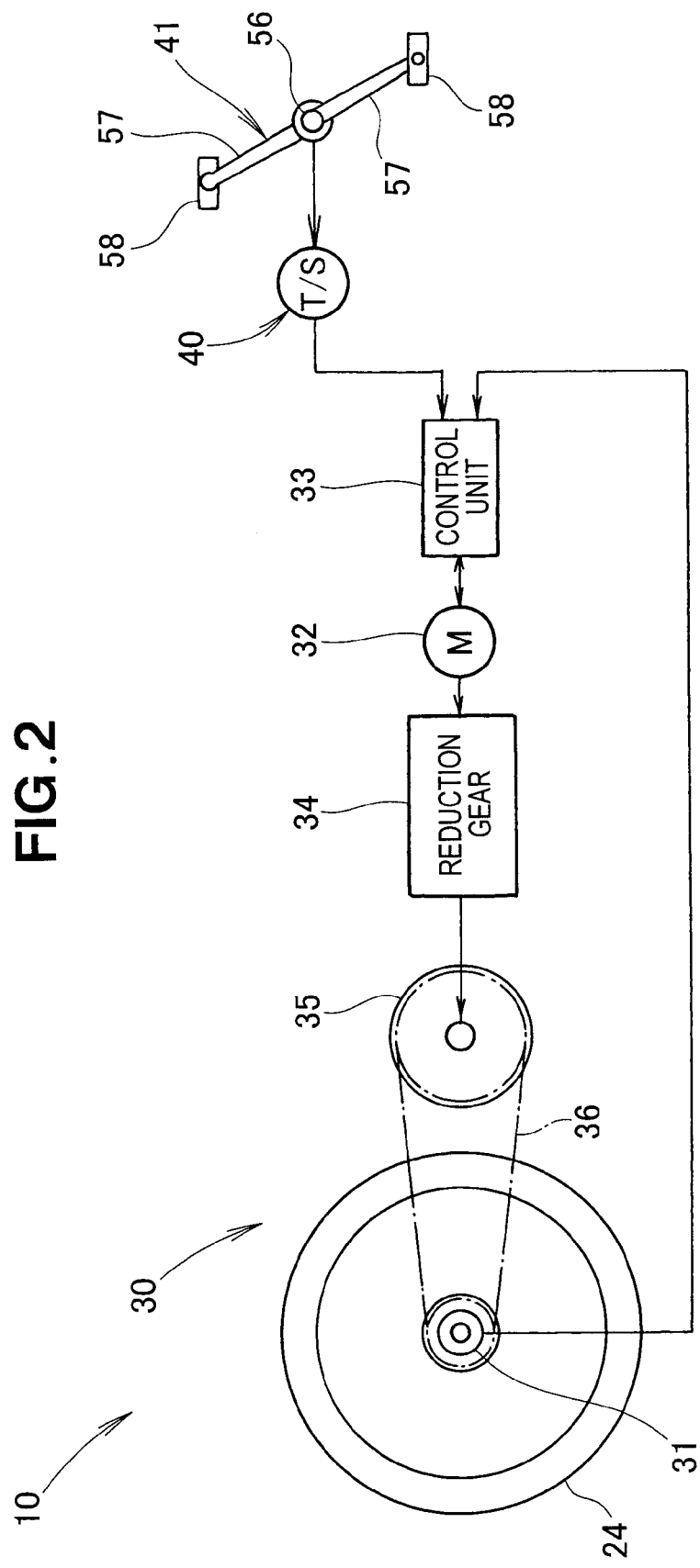
FIG. 2 is a diagrammatical view of a power unit shown in FIG. 1.

As shown in FIG. 2, the power unit 30 includes a pedal crank 41 including the pedals 58, 58, a magnetostrictive sensor 40 for detecting a torsional torque produced when a rider pushes the pedals 58, 58 with his feet, a speed sensor 31 attached to the rear wheel 24 for measuring a traveling speed of the bicycle 10, and a control unit 33 connected to the speed sensor 31 and the magnetostrictive sensor 40. The control unit 33 is adapted to calculate a rider's pedaling force from the detected torque, and control an electric motor 32 on the basis of values of the calculated pedaling force and the traveling speed.

Based on a control signal output from the control unit 33, the electric motor 32 produces an auxiliary torque corresponding to a pedaling torque exerted by the rider's feet on the pedals 58, 58 of the pedal crank 41. The auxiliary torque is transmitted to a reduction gear 34 connected to an auxiliary sprocket 35 connected via a chain 36 to the rear wheel 24. The auxiliary torque produced by the electric motor 32 and the pedaling torque exerted by the rider's feet on the pedals 58, 58 are combined into a composite torque for propelling the bicycle 10.

Figure 3:
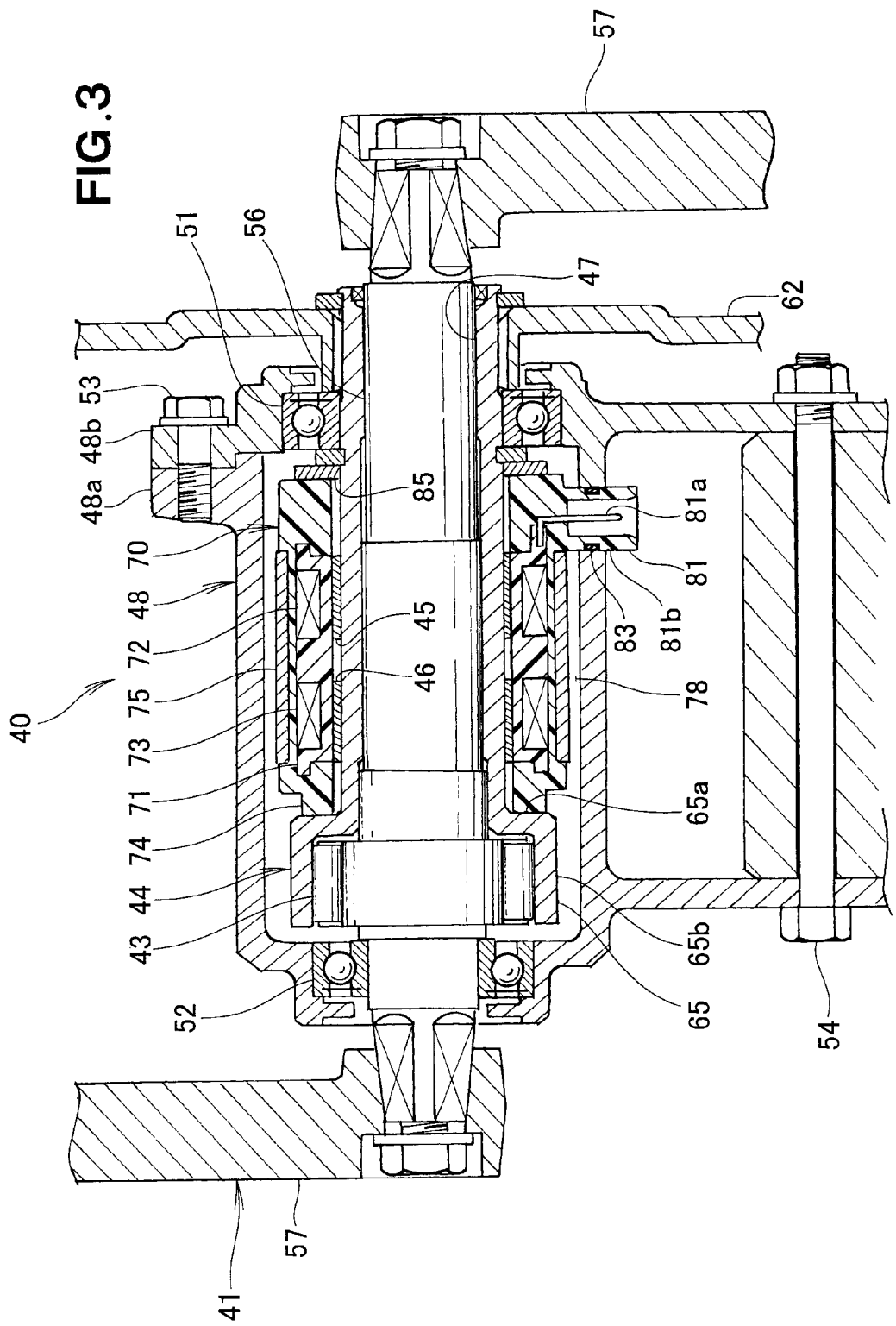
FIG. 3 is a cross-sectional view taken along line 3-3 of FIG. 1.

As shown in FIG. 1 and FIG. 3, the pedal crank 41 includes a crankshaft 56 and crank arms 57, 57 extending from opposite ends of the crankshaft 56 in perpendicular to the crankshaft 56. Each of the crank arms 57, 57 has a distal end carrying the pedal 58. The crankshaft 56 has one end carrying a one-way clutch 43. The crankshaft 56 rotatably fits through a hollow rotational shaft 44 and is connected to the hollow rotational shaft 44 via the one-way clutch 43.

The magnetostrictive torque sensor 40 includes magnetostrictive portions 45, 46 (see also FIG. 4) formed on an outer circumferential surface of the rotational shaft 44, and a coil unit 70 disposed about an outer circumference of each of the magnetostrictive portions 45, 46.

The crankshaft 56 has opposite ends projecting out of a case 48 of the magnetostrictive torque sensor 40. The one end of the crankshaft 56 is rotatably supported by a bearing 52 accommodated in the case 48. The other end of the crankshaft 56 is rotatably supported by a plain bearing 47 in the hollow rotational shaft 47. The rotational shaft 44 is rotatably supported by a bearing 51 accommodated in the case 48. The rotational shaft 48 is supported on the crankshaft 56. The case 48 includes a case body 48a and a lid 48b closing one open end of the case body 48a. The lid 48b is attached to the case body 48a by a bolt 53. The case 48 houses the rotational shaft 44 and the magnetostrictive portions 45, 46 and the coil unit 70.

Figure 4:
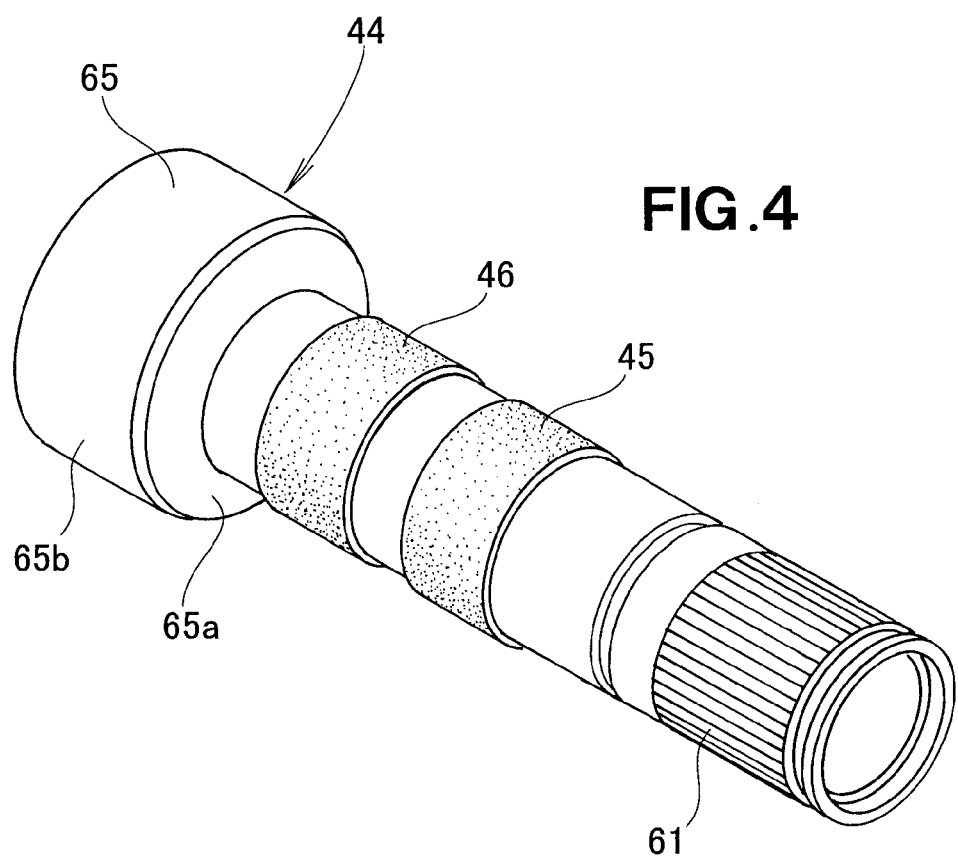
FIG. 4 is a perspective view of a rotational shaft shown in FIG. 3.

Referring to FIG. 4, the rotational shaft 44, which is disposed about an outer circumference of the crankshaft 56, has one end including a serration 61. The serration of the one end of the rotational shaft 44 engages a drive sprocket 62 for transmitting to the rear wheel 24 (FIG. 1) a pedaling force of the rider. The drive sprocket 62 is connected to the rear wheel 24 via the chain 36, as shown in FIG. 1.

The rotational shaft 44 has an opposite end defining a housing portion 65 having an enlarged diameter to receive the one-way clutch 43. The housing portion 65 includes an enlarged section 65a extending circumferentially thereof and a wall section 65b extending from the enlarged section 65a away from the magnetostrictive portions 45, 46 and surrounding the one-way clutch 43.

Turning back to FIG. 3, the coil unit 70 includes a bobbin 71 supported by the rotational shaft 44 in contact with the magnetostrictive portions 45, 46, and coils 72, 73 wound on the bobbin 71 for detecting a change in magnetic property occurring in the magnetostrictive portions 45, 46. The coil unit 70 further includes a housing 74 covering the coils 72, 73 and the bobbin 71, and a yoke 75 fixed to an outer circumferential surface of the housing 74.

The magnetostrictive portions 45, 46 are formed on the rotational shaft 44 and the bobbin 71 contacts the magnetostrictive portions 45, 46. Thus, when a load is applied to the rotational shaft 44 in such a direction as to twist the rotational shaft 44, the bobbin 71 follows the twisted shaft 44. This results in no substantial change in distance between the magnetostrictive portions 45, 46 and the coils 72, 73. Because of no substantial change in distance between the magnetostrictive portions 45, 46 and the coils 72, 73, detection sensitivity of the magnetostrictive torque sensor 40 is stable and detection accuracy of the magnetostrictive sensor 40 is enhanced.

Since the bobbin 71 is in contact with the magnetostrictive portions 45, 46, the coils 72, 72 wound on the bobbin 71 are located proximate the magnetostrictive portions 45, 46. Since the coils 72, 73 and the bobbin 71 are located close to the magnetostrictive portions 45, 46, not only is the detection sensitivity of the magnetostrictive torque sensor 40 improved, but a temperature change occurring in the coils 72, 73 or the bobbin 71 quickly affects other elements such as the magnetostrictive portions 45, 46, such that a difference in temperature between the coils 72, 73 and the magnetostrictive portions 45, 46 becomes small quickly. Since the temperatures of the magnetostrictive portions 45, 46 quickly becomes near the temperatures of the coils 72, 73, torque detection by the magnetostrictive sensor 40 can be steady and high detection accuracy of the sensor 40 is secured.

The housing 74 covering the bobbin 71 is not in contact with the rotational shaft 44. In other words, the rotational shaft 44 is in contact with only the essential elements so as to undergo a reduced resistance during rotation.

The case 48 covers outer circumferential surfaces of the housing 74 and the yoke 75 with a clearance 78 defined between the case 48 and the outer circumferential surfaces of the housing 74 and the yoke 75. In other words, an outer circumferential surface of the bobbin 71 covered by the housing 74 lies with the clearance 78 formed between the case 48 and the outer circumferential surface of the bobbin 71. Also, the coils 72, 73 wound on the bobbin 71 are covered by the case 48 with the clearance 78 formed between the case 48 and the coils 72, 73. The clearance 78 between the case 48 and the coils 72, 73 provides an air layer acting as a thermal insulating layer to make it difficult for the coils 72, 73 to be affected by a change in temperature outside the case 48, and hence abrupt change in temperature of the coils 72, 73 can be prevented. The prevention of the abrupt temperature change allows the coils 72, 73 to perform a steady detection operation. This results in an enhanced detection accuracy of the magnetostrictive torque sensor.

In addition, the clearance 78 between the housing 74 and the case 48 prevents the housing 74 (and the bobbin 71) from getting caught between the case 48 and the rotational shaft 48 even if the rotational shaft 48 is forced to twist. It is thus possible to prevent the bobbin 71 from being compressed between the rotational shaft 44 and the case 48.

Formed integrally with the housing 74 is a terminal 81 for energizing the coils 72, 73. The terminal 81 extends from the bobbin 71 through the case 48. The terminal 81 includes an energizing portion 81a and a perimeter wall portion 81b surrounding the energizing portion 81a.

A seal 83 acting as an elastic member is interposed between the terminal 81 and the case 48. The seal 83 is adapted to absorb vibration of the case transmitted from outside the case 48. This means that the seal 83 prevents application of an external force from the case 48 to the terminal 81, whereby the external force is not applied to the bobbin 71. The prevention of transmission of the external force to the bobbin 71 makes it possible to steadily detect a torsional torque applied to the rotational shaft 44. This steady detection of the torsional torque enhances detection accuracy of the magnetostrictive torque sensor 40. It is noted that the elastic member may be another member such as a leaf spring.

A force applied to the rotational shaft 44 may be transmitted to the bobbin 71. The seal 83, which is interposed between the case 48 and the terminal 81 extending from the bobbin 71, can absorb the force between the case 48 and the terminal 81 so as to reduce a reaction force from the case 48.

The use of the seal 83 as the elastic member enhances sealing of an area enclosed in the case 48, thereby preventing abrupt temperature change from occurring in the clearance 78 within the case 48. The prevention of the abrupt temperature change enhances detection accuracy of the coils 72, 73.

The housing 74 has one end held in contact with a leaf spring 85. The leaf spring 85 urges the housing 74 to the housing portion 65 of the rotational shaft 44 such that an opposite end of the housing 74 is held against the enlarged section 65a of the housing portion 65 to retain the housing 74 in place. That is, the bobbin 71 covered by the housing 74 is retained in place by the housing portion 65. The housing portion 65 of the rotational shaft 44 has its one end surface fixing an axial position of the bobbin 71, thereby preventing axial movement of the bobbin 71, such that the coils 72, 73 are accurately positioned relative to the magnetostrictive portions 45, 46. Since no additional members are required in positioning the coils 72, 73 relative to the magnetostrictive portions 45, 46, downsizing of the magnetostrictive torque sensor can be achieved. The accurate positioning of the coils 72, 73 relative to the magnetostrictive portions 45, 46 enhances a detection accuracy of the magnetostrictive sensor 40.

The rotational shaft 44 is smaller in size because the rotational shaft 44 is radially enlarged only at one part necessary to receive the one-way clutch 43. Since the positioning of the coils 72, 73 is done by use of the portion of the rotational shaft 44, additional members need not be provided for the purpose of positioning the coils 72, 73. In other words, the positioning can be advantageously done by the smaller number of elements.

The magnetostrictive portions 45, 46 are each a single magnetostrictive film of substantially constant thickness formed on an overall circumference of the rotational shaft 44. Because of the constant thickness of the film, the film keeps its temperature stable entirely. Since the temperature is stable throughout the film, detection accuracy for a torsional torque is enhanced.

The crank arm 57 and the crankshaft 56 are rotated by a rider pushing the pedal 58 (FIG. 1) with his foot. The rotational shaft 44, which is connected via the one-way clutch 43 to the crankshaft 56, is rotated only when the crankshaft 56 is rotated in such a direction as to propel the bicycle 10 in a forward direction. The coil unit 70 is not rotated. More specifically, the terminal 81 integral with the housing 74 of the coil unit 70 extends through the case 48, thereby preventing rotation of the coil unit 70. That is, the terminal 81 is used to prevent the rotation of the coil unit 70.

The magnetostrictive torque sensor 40 of the bicycle 10 has the bobbin 70 directly supported by the rotational shaft 44. Because of the bobbin 70 directly supported by the rotational shaft, the magnetostrictive sensor 40 is smaller in size than if the bobbin 71 and the rotational shaft 44 were supported by separate members, respectively. The smaller size of the magnetostrictive sensor 40 makes a vicinity of the crankshaft 56 compact. That is, members which would otherwise hinder a rider's pedaling operation are compactly arranged away from a trajectory of the revolving pedal so as to facilitate the pedaling operation. In addition, these compactly arranged members provide pleasant visual appearance.

Figure 5:
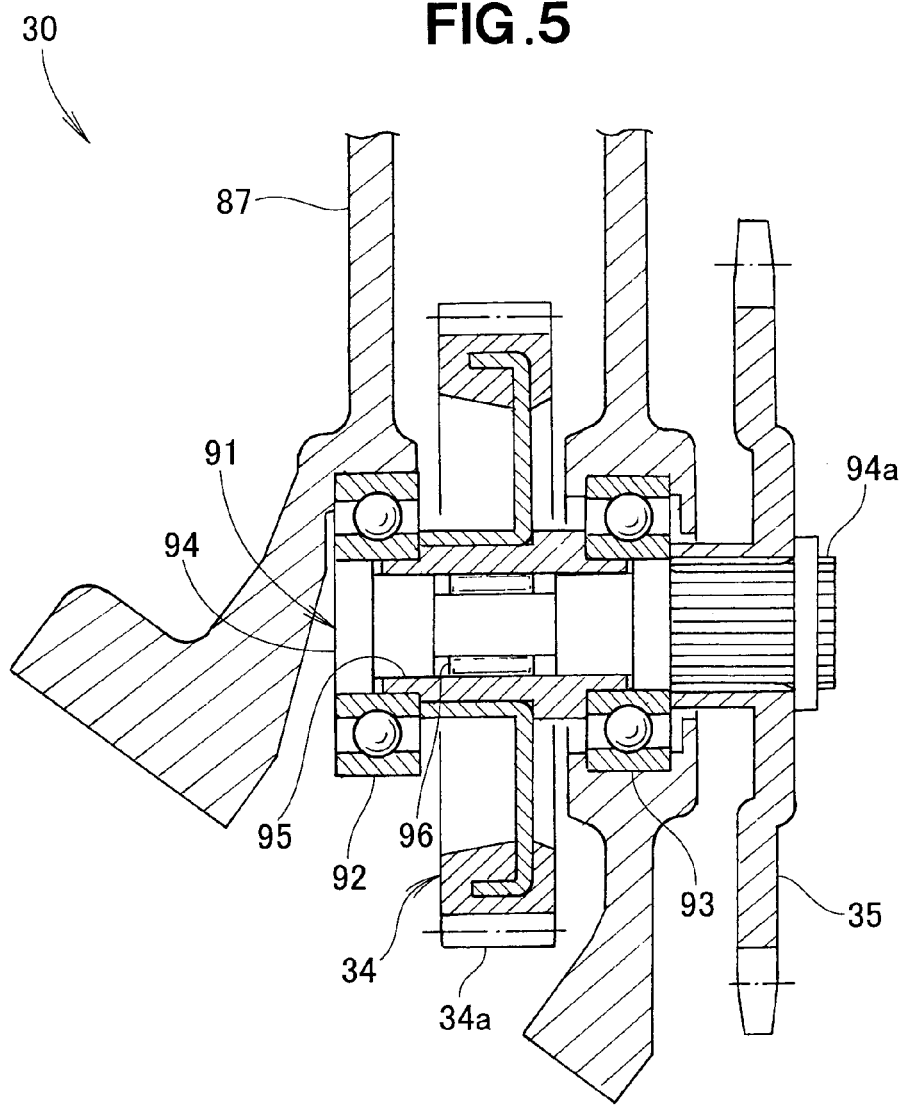
FIG. 5 is a cross-sectional view taken along line 5-5 of FIG. 1.
Figure 6:
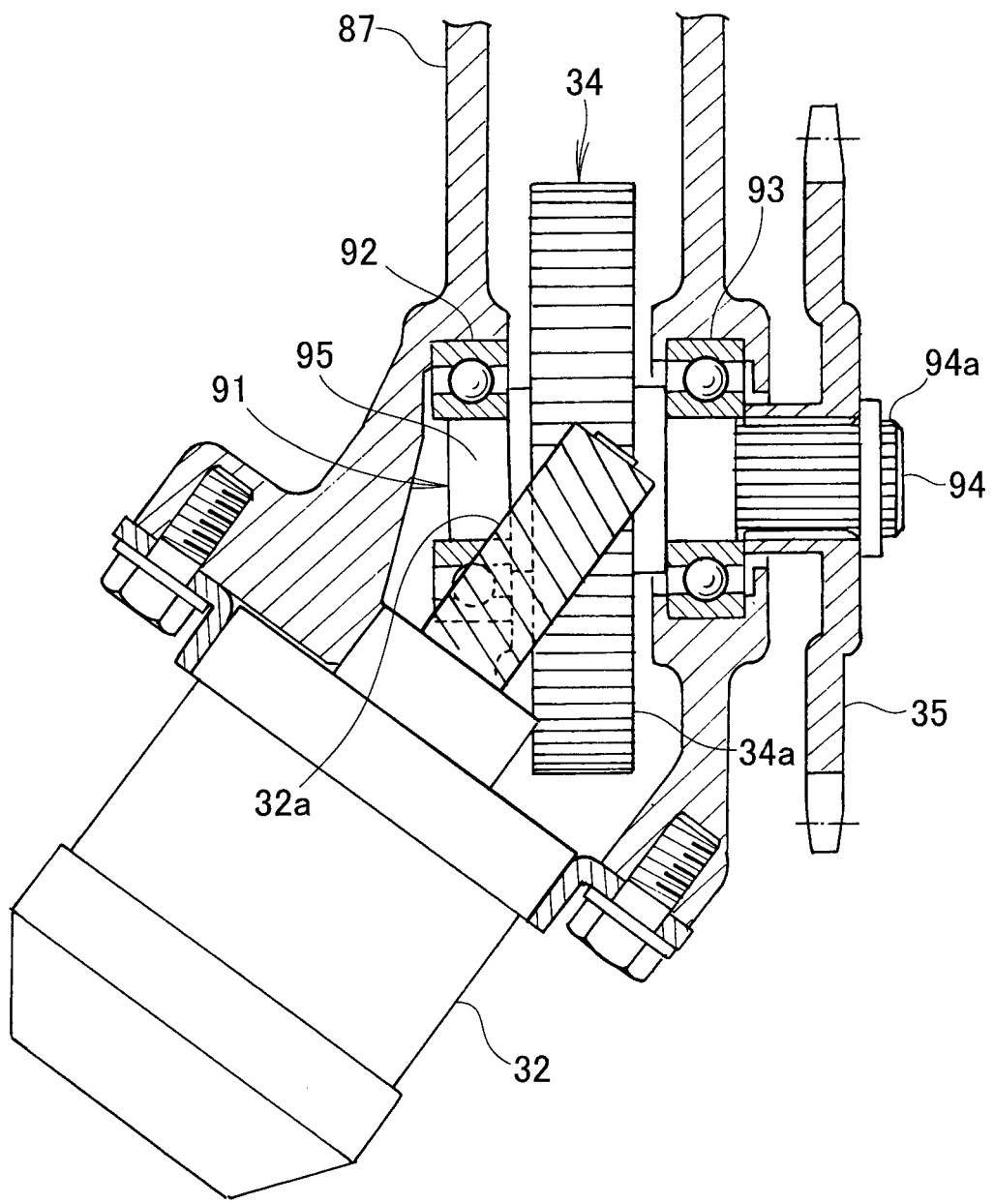
FIG. 6 is a view showing a positional relationship between an electric motor and a reduction gear shown in FIG. 5.

As shown in FIG. 5 and FIG. 6, the electric motor 32 attached to a body 87 of the bicycle 10 is downward inclined so that the electric motor 32 has a smaller size in a lateral direction of the bicycle 10. The small size of the motor 32 in the lateral direction of the bicycle 10 prevents a rider's foot from contacting the electric motor 32.

The reduction gear 34 is a worm gear mechanism including a worm 32a attached to an output shaft of the electric motor 32, and a worm wheel 34a meshing with the worm 32a.

The reduction gear 34 and the auxiliary sprocket 35 are supported by an auxiliary torque rotational shaft 91 attached through bearings 92, 93 to the body 87 of the bicycle 10. The auxiliary torque rotational shaft 91 is a dual shaft structure formed by an inner shaft 95 and an outer shaft 95. The outer shaft 95 surrounds the inner shaft 94 and is connected to the inner shaft 94 via a one-way clutch 96.

The inner shaft 94 of the auxiliary torque rotational shaft 91 has a distal end carrying a serration 94a engaging the auxiliary sprocket 35. The outer shaft 95 engages the reduction gear 34.

Rotation of the worm 32a causes rotation of the worm wheel 34a meshing with the worm 32a and the outer shaft 95 engaging the worm wheel 34a. The rotation of the outer shaft 95 causes the inner shaft 94 to rotate by means of the one-way clutch 96 only when the worm 32a rotates in such a direction as to propel the bicycle 10 in the forward direction. The rotation of the inner shaft 94 causes rotation of the auxiliary sprocket 35. It is noted that if the chain 36 trained around the auxiliary sprocket 35 runs in a direction opposite a direction of forward propulsion of the bicycle, only the inner shaft 94 is rotated while the outer shaft 95, the worm wheel 34a and the worm 32a are not rotated.

A second embodiment of the present invention is discussed hereinafter. According to the second embodiment of the present invention, the magnetostrictive torque sensor discussed above may be used in an electric power steering apparatus 100 of a vehicle, as is discussed hereinafter.

Figure 7:
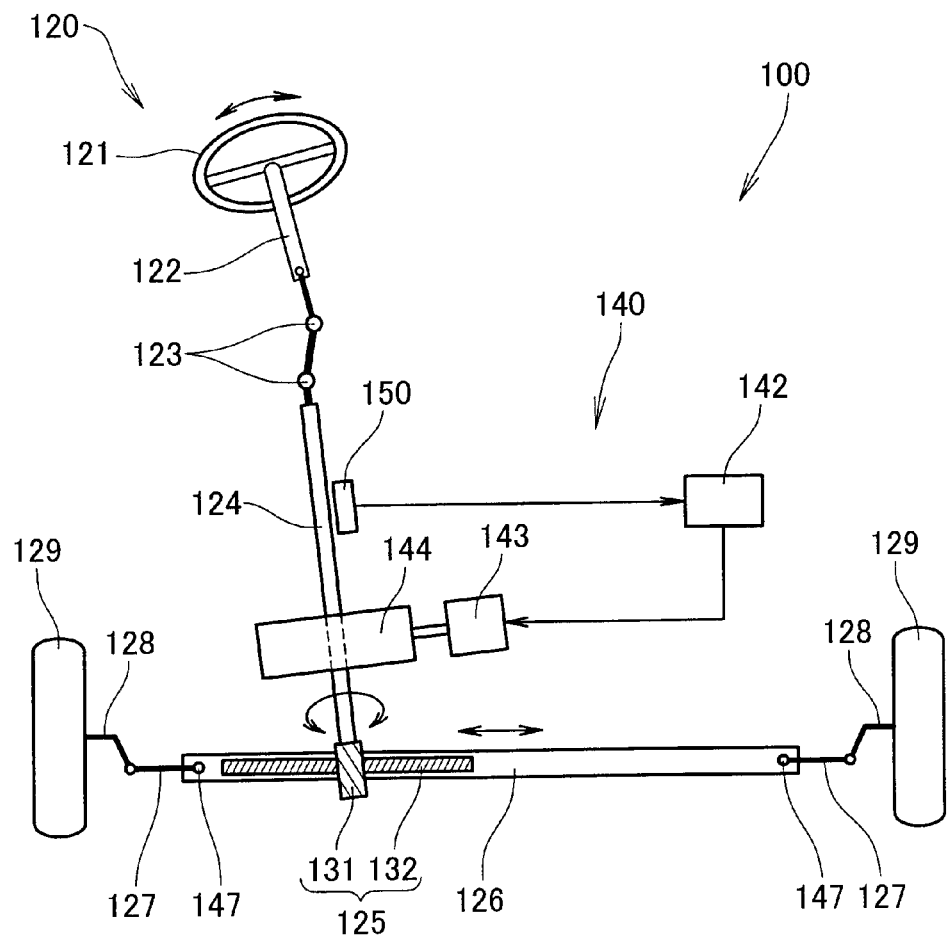
FIG. 7 is a diagrammatical view of an electric power steering apparatus carrying a magnetostrictive sensor in a second embodiment of the present invention.

As shown in FIG. 7, the electric power steering apparatus 100 includes a steering system 120 from a steering wheel 121 to left and right steerable vehicle wheels 129, 129 (e.g., front vehicle wheels), and an auxiliary torque mechanism 140 for producing an auxiliary torque to be applied to the steering system 120.

In the steering system 120, a rotational shaft (a pinion shaft) 124 is connected to the steering wheel 121 via a steering shaft 122 and universal joints 123. A rack shaft 126 is connected to the rotational shaft 124 via a rack-and-pinion mechanism 125. The rack shaft 126 has opposite ends to which the left and right vehicle wheels 129, 129 are connected via left and right tie rods 127, 127 and knuckles 128, 128.

The rack-and-pinion mechanism 125 includes a pinion 131 formed on the rotational shaft 124 and a rack 132 formed on the rack shaft 126. A driver steers the steering wheel 121 to produce a steering torque for steering the left and right vehicle wheels 129, 129 by means of the rack-and-pinion mechanism 125 and the left and right tie rods 127, 127.

The auxiliary torque mechanism 140 includes a magnetostrictive torque sensor 150 for detecting a steering torque which a driver applies to the steering wheel 121 by steering the steering wheel 121. The auxiliary torque mechanism 140 also includes a control unit 142 for generating a control signal based on a torque detection signal output from the magnetostrictive torque sensor 150. The auxiliary torque mechanism 140 further includes an electric motor 143 for producing an auxiliary torque corresponding to the steering torque on the basis of the control signal. The auxiliary torque is transmitted via a worm gear mechanism 144 to the rotational shaft 124, and then to the rack-and-pinion mechanism 125.

The steering torque by the driver and the auxiliary torque by the electric motor 143 are combined into a composite torque for steering the vehicle wheels 129, 129.

Figure 8:
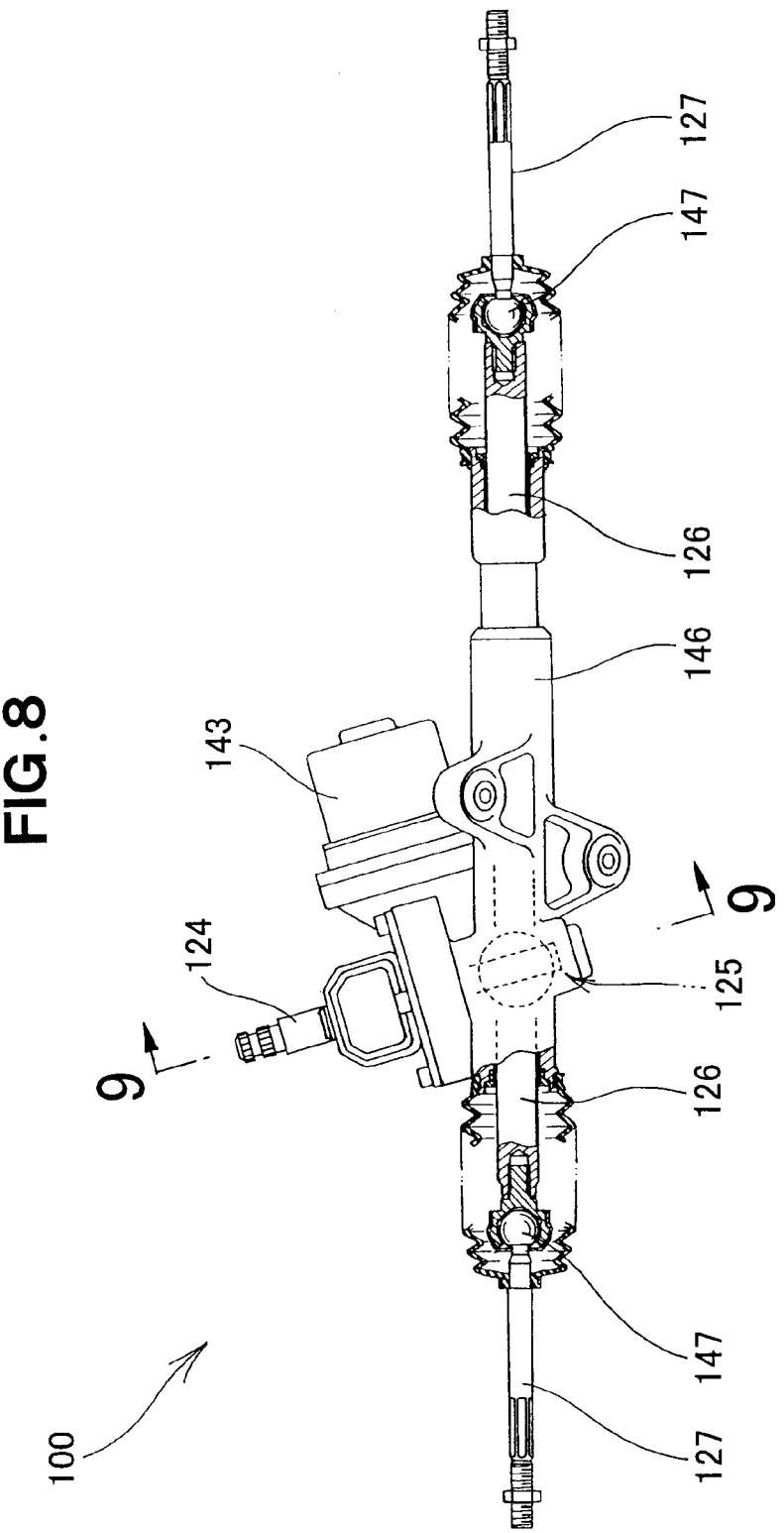
FIG. 8 is an overall view of the electric power steering apparatus shown in FIG. 7.

As shown in FIG. 8, a rack shaft housing member 146 extends laterally of the vehicle and houses the rack shaft 126 in such a manner as to allow the rack shaft 126 to axially slide. The rack shaft 126 has the opposite ends projecting out of the rack shaft housing member 146 and connected to the tie rods 127, 127 via ball joints 147, 147.

Figure 9:
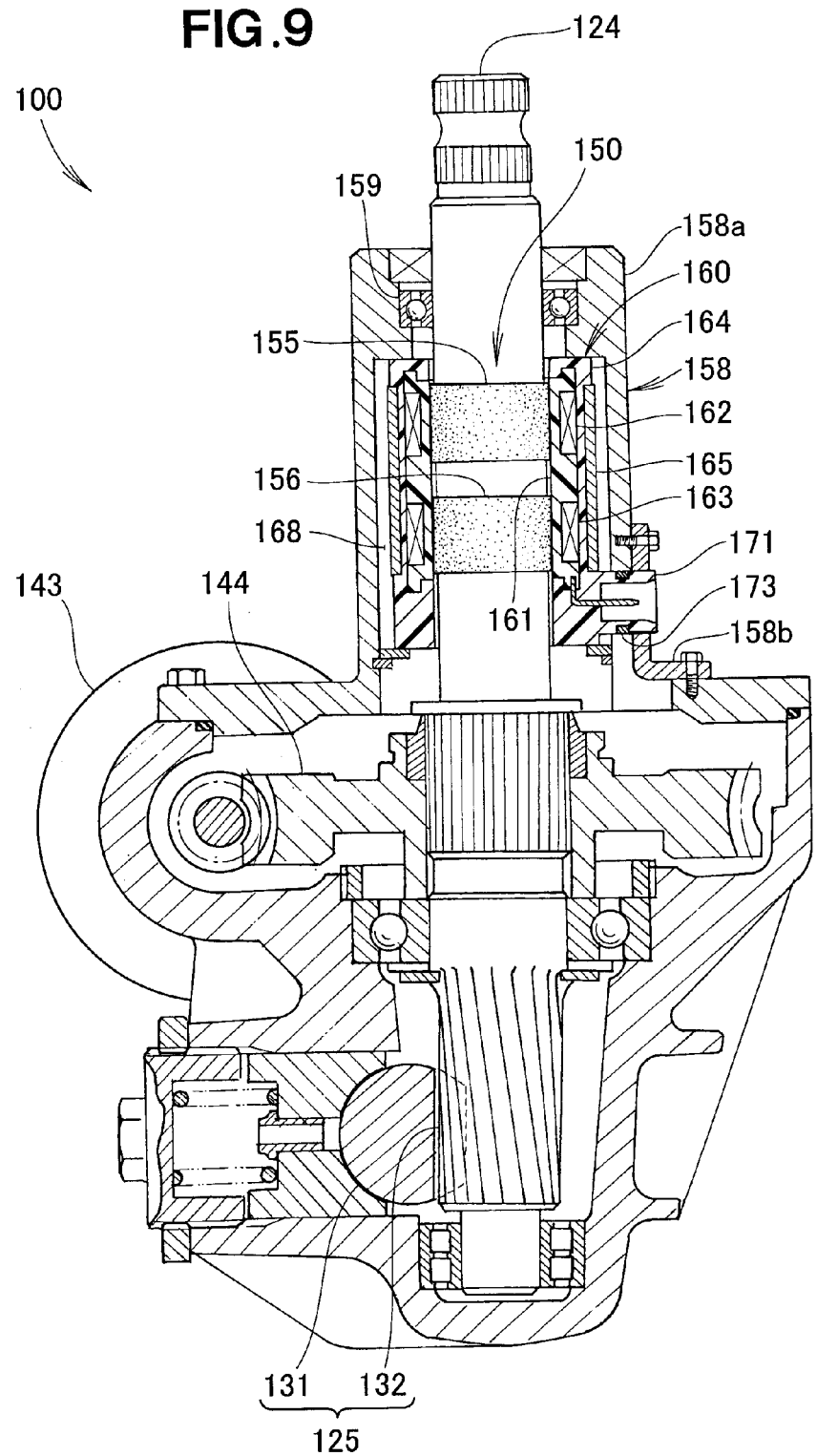
FIG. 9 is a cross-sectional view taken along line 9-9 of FIG. 8.
Figure 10:
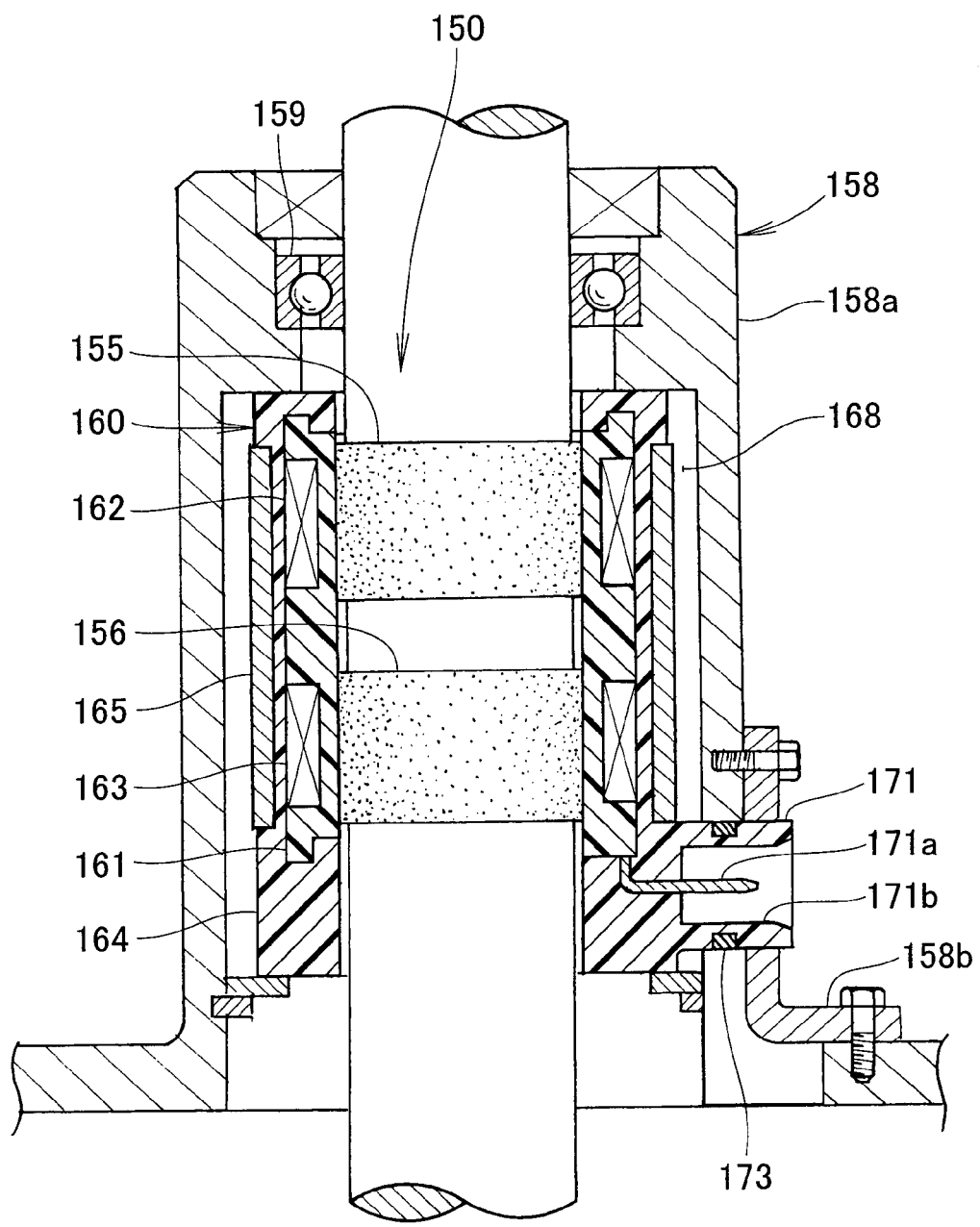
FIG. 10 is an enlarged view of a magnetostrictive torque sensor shown in FIG. 9.

As shown in FIG. 9 and FIG. 10, the magnetostrictive torque sensor 150 includes magnetostrictive portions 155, 156 formed on an outer circumferential surface of the rotational shaft 124, and a coil unit 160 disposed on an outer circumference of each of the magnetostrictive portions 155, 156 in such a manner as to allow rotation of the magnetostrictive portions 155, 156 relative to the coil unit 160. The magnetostrictive portions 155, 156 and the coil unit 160 are accommodated in a case 158. The rotational shaft 124 is supported by a bearing 159 within the case 158. The case 158 includes a plurality of members 158a, 158b.

The coil unit 160 includes a bobbin 161 supported by the rotational shaft 124 in contact with the magnetostrictive portions 155, 156, and coils 162, 163 wound on the bobbin 161 for detecting a change in magnetic property occurring in the magnetostrictive portions 155, 156. The coil unit 160 also includes a housing 164 surrounding the coils 162, 163 and the bobbin 161, and a yoke 165 fixed on an outer circumferential surface of the housing 164. The housing 164 and the yoke 165 have their outer circumferential surfaces covered by the case 158 with a clearance 168 defined between the case 158 and the outer circumferential surfaces of the housing 164 and the yoke 165.

Formed integrally with the housing 164 is a terminal 171 extending from the bobbin 161 through the case 158 for energizing the coils 162, 163. The terminal 171 includes an energizing portion 171a and a perimeter wall portion 171b surrounding the energizing portion 171a. A seal 173 acting as an elastic member is interposed between the terminal 171 and the case 158.

The magnetostrictive torque sensor 150 provides an enhanced detection sensitivity even when carried on the electric power steering apparatus 100.

The magnetostrictive torque sensor 150 has a smaller size than if the rotational shaft 124 and the bobbin 161 were supported by separate members, respectively. Because of the smaller size of the magnetostrictive sensor 150, the electric power steering apparatus 100 is arranged compactly. The magnetostrictive torque sensor exhibits its performance without depending upon the case, and thus can be carried on any electric power steering apparatus regardless of type of the electric power steering apparatus. Since the magnetostrictive torque sensor has the smaller size, the electric power steering apparatus is so compact as to be carried on a vehicle which is not suitable for carrying a hitherto known electric power steering apparatus.

It is noted that although the magnetostrictive torque sensor has been described as being carried on the electrically assisted bicycle or the electric power steering apparatus of the vehicle, the sensor may be applicable to others.

The magnetostrictive torque sensor is suitable for an electrically assisted bicycle.

Obviously, various minor changes and modifications of the present invention are possible in the light of the above teaching. It is therefore to be understood that within the scope of the appended claims the invention may be practiced otherwise than as specifically described.

What is claimed is:

1. A magnetostrictive torque sensor comprising:
a magnetostrictive portion formed on a rotational shaft;
a bobbin surrounding an outer circumference of the magnetostrictive portion;
a coil wound on the bobbin for detecting a change in magnetic property of the magnetostrictive portion;
a case covering the bobbin with a clearance defined between the case and an outer peripheral surface of the bobbin; and
a terminal extending from the bobbin through the case in a direction perpendicular to an axis of the rotational shaft for energizing the coil,
wherein the bobbin fits over the magnetostrictive portion in contact with the magnetostrictive portion in such a manner as to allow rotation of the magnetostrictive portion relative to the bobbin,
wherein the bobbin is supported by the rotational shaft,
wherein the bobbin is slidably in contact with the magnetostrictive portion such that when the rotational shaft is subjected to a load tending to twist the rotational shaft, the bobbin follows the twisting of the rotational shaft,
wherein the terminal extending through the case serves to prevent the bobbin from rotating together with the rotational shaft due to contact with the magnetostrictive portion, and
wherein the clearance provides an air layer acting as a thermal insulating layer to make it difficult for the coils to be affected by a change in temperature outside the case.

2. The magnetostrictive torque sensor of claim 1, wherein the magnetostrictive portion is a single magnetostrictive film formed on an overall circumference of the rotational shaft, the magnetostrictive film having a substantially constant thickness.

3. The magnetostrictive torque sensor of claim 1, further comprising:
an elastic member interposed between the terminal and the case.

4. The magnetostrictive torque sensor of claim 1, wherein the case is divided into two parts with the terminal as a boundary in the axial direction of the rotational shaft.

* * * * *